United States Patent [19]
Krasik

[11] Patent Number: 5,210,791
[45] Date of Patent: May 11, 1993

[54] TELEPHONE HEADSET ON-LINE INDICATOR

[76] Inventor: Michael Krasik, 1849 N. 53rd St., Seattle, Wash. 98103

[21] Appl. No.: 626,979

[22] Filed: Dec. 13, 1990

[51] Int. Cl.$^5$ ............................................. H04M 1/05
[52] U.S. Cl. .................................. 379/377; 379/387; 379/396
[58] Field of Search ............... 379/387, 396, 428, 430, 379/377; 455/159

[56] References Cited

U.S. PATENT DOCUMENTS 4,175,217  11/1979  Williams .............................. 379/430
4,754,484  6/1988  Larkin et al. .................... 379/433 X

FOREIGN PATENT DOCUMENTS 2154392  9/1985  United Kingdom ................ 379/396

Primary Examiner—James L. Dwyer
Assistant Examiner—M. Shehata
Attorney, Agent, or Firm—Michael J. Folise

[57] ABSTRACT

A telephone headset on-line indicator uses a light emitting diode located on a boom of a headset to indicate that the user is on-line with another telephone. Circuits are described for use with use with conventional telephones, electronic telephones and PBX telephone base units.

13 Claims, 4 Drawing Sheets

TELEPHONE HEADSET ON-LINE INDICATOR

TECHNICAL FIELD

The invention relates to telephone equipment. More specifically, the invention relates to telephone headsets for freehand operation of telephones.

BACKGROUND OF THE INVENTION

Operation of a telephone switchboard or PBX is typically among the duties assigned to an office receptionist. In addition to connecting an incoming telephone call with the appropriate person within the office, the receptionist is often required to take messages when the desired party is unavailable. Receptionists are well aware that it is difficult to write a telephone message while cradling a conventional telephone handset between the head and shoulder. Therefore, so-called "hands free" telephone headsets have been designed which will operate with telephone base units. These headsets include a curved boom which positions a small microphone in close proximity to the front of the receptionist's mouth. An earphone is positioned at the other end of the boom so as to be adjacent to the receptionist's ear. A headband suspends the boom and earphone adjacent to the receptionist's face.

A very successful line of after market headsets have been designed for use with conventional telephone base units. Headsets of this type use the same four electrical connections between the headset and base unit as are present between a conventional telephone handset and a telephone base unit. Two of these electrical connections are receiving lines which receive electrical signals transmitted by the calling telephone to the earphone of the headset or handset of the called telephone. The remaining two electrical connections are transmitting lines which carry electrical signals from the microphone of the telephone headset or handset to the telephone base unit.

A continuing problem with the use of the now popular "hands free" telephone headsets is that only the receptionist is usually aware that he or she is currently "on line" with someone on the other end of the telephone. There are no visual cues to advise a guest or client in the reception area that the receptionist is listening to a speaker at the other end of the line. With conventional telephone handsets, it is abundantly clear that at least the telephone is "off the hook" whenever the receptionist cradles the telephone handset between his or her head and shoulder. With the telephone headset, however, the only visual cues which indicates that the receptionist is currently on the line is movement of the receptionist's lips. Clearly, this only occurs when the receptionist is talking and not listening. This motion is often difficult to see if the receptionist's head is slightly bowed, slightly turned, or if the receptionist is soft-spoken. Thus, a guest or client in the reception room may inadvertently interrupt a telephone conversation by addressing the receptionist when he or she is listening and is on the line. These situations are difficult for any receptionist to handle gracefully. In addition, even if the receptionist can politely inform the interrupting guest that he or she is currently on the line, such as by raising and index finger, the guest or client is often embarrassed and the receptionist's train of thought is broken thus possibly causing him or her to miss the message and requiring him or her to ask the caller to repeat the message.

Conventional, pre-electronic, multiple-line telephones are known which have a series of push-buttons illuminated by incandescent bulbs along the bottom edge of the telephone. Typically, a red hold button is provided at the right hand lower corner of the telephone base unit. Each of these transparent buttons, when illuminated, indicates that the handset has been removed from the base unit and that the base unit is on-line if the light is continuous. A flashing light indicates that another line is ringing. Nevertheless, these illuminated push-buttons are not located for effective viewing by guests in a reception area. Furthermore, these incandescent bulbs draw heavy currents and cannot advantageously use the low current signals which are present on the cable connecting the headset or hand set to the telephone base unit. Electronic telephones and PBX base units use solid state lighting devices to indicate that a particular line is in use, and that the base unit is on-line. Nevertheless, these lights are not appropriately positioned for viewing by a guest in a reception area, nor do these solid state devices advantageously use the signals which are present in the cable connecting a telephone headset to a base unit.

In view of the above, a need exists for a method and apparatus which will subtlety but clearly indicate to an observer that a telephone headset is currently in use with a telephone in the "on line" (or "off the hook") condition. Such method and device would preferably retrofit existing, conventional telephone base units and be adaptable to modern, electronic telephones.

SUMMARY OF THE INVENTION

It is therefore an object of the present invention to provide a headset on-line indicator for use with a telephone of the type having a base unit connected to the headset by two transmitting lines and two receiving lines.

It is yet a further object of the present invention to provide an on-line indicator of the type described above which is retrofitable to both conventional telephone base units and telephone base units of the modern, electronic type.

It is yet a further object of the invention to achieve the above two objects with a device which is simple and inexpensive to manufacture and which does not require any modification of the existing national telephone system.

These objects, and other objects and advantages of the invention which will become apparent from the description which follows, are achieved by providing a telephone headset having a light emitting device at a conspicuous location on the headset boom. The invention senses when a telephone base unit is in an on-line condition and illuminates the light emitting device to advise observers of the same.

In its preferred embodiment, no additional wiring is required between the headset and a telephone base unit other than the conventional four wires (two transmitting lines and two receiving lines) which are currently used. The invention senses the "on-line condition" by monitoring the voltage potential across the two transmitting lines. The invention can be provided with special circuitry for determining both the on line condition and the "hold" condition in modern, electronic telephone base units.

In an alternate embodiment of the invention, the voltage across two lines emanating from the telephone company are monitored at a location prior to the lines entering the telephone base unit. When the on-line condition is sensed, the light-emitting device is illuminated.

The light emitting device can be a diode provided at the end of the boom adjacent to the user's mouth. In addition, the entire boom can be made of translucent material or fiber optic cable which is illuminated by the LED when the telephone is in the on-line condition.

BEST MODE FOR CARRYING OUT THE INVENTION

Figure 1:
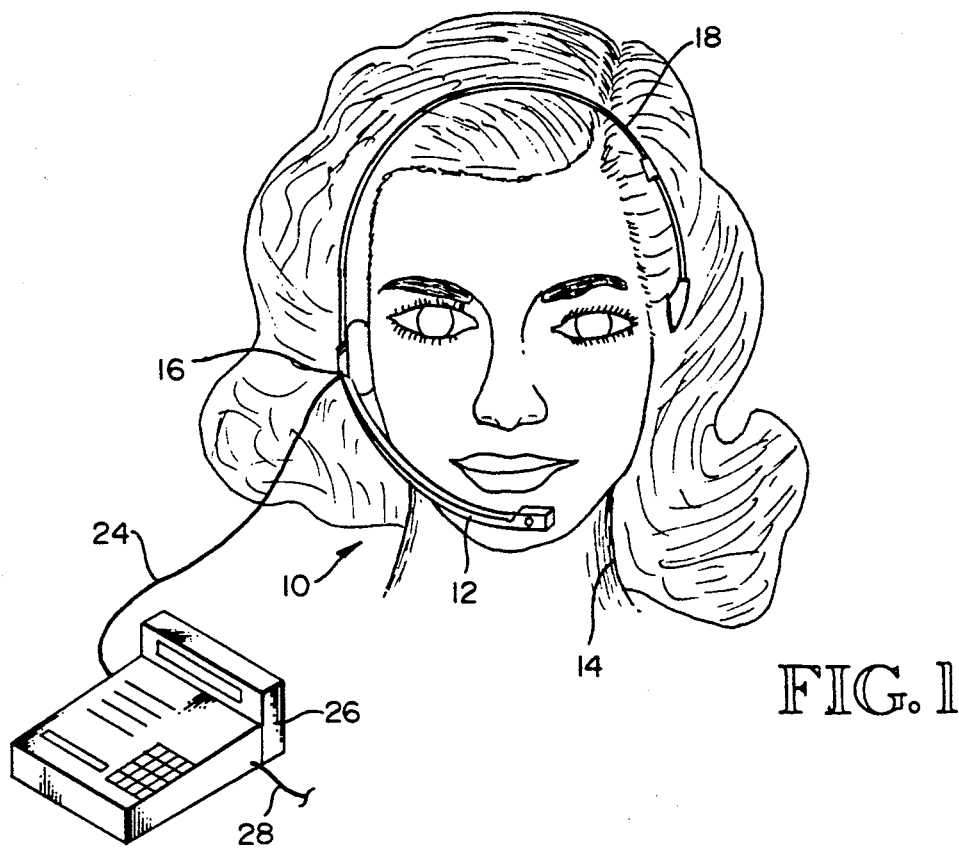
FIG. 1 is a front elevational view of a person using the telephone headset of the present invention.

A telephone headset, in accordance with the principles of the invention, is generally indicated at reference numeral 10, in FIG. 1. The headset includes an elongated, curved boom 12 for receiving speech from a headset user 14. The headset also has an ear piece 16 which receives transmissions from a caller. The ear piece and boom are connected together and are in turn supported from a headband 18 which positions the ear piece and boom appropriately on the user's head.

The telephone headset 10 is connected by a cable 24 to a telephone base unit 26. The cable 24 has four signal lines contained therein. Two of the lines are receiving lines which are connected to a speaker in the ear piece 16. The two receiving lines receive signals from a transmitting telephone connected through the telephone company to an input line 28. The remaining two lines within the cable 24 are transmitting lines which are connected to a microphone associated with the boom 12. The microphone transmits speech from the user 14 through the input line 28 and base unit 26 to the telephone company and thus to the connected telephone at the other end of the telephone company line.

Figure 2:
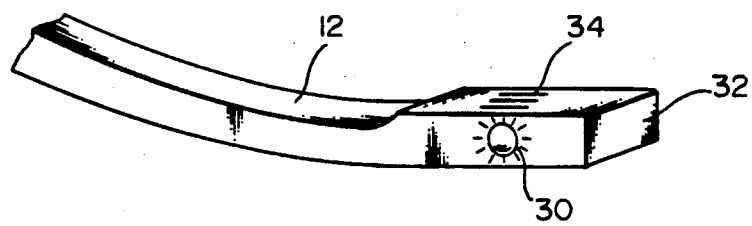
FIG. 2 is an enlarged, sectional, perspective view of a boom of the telephone headset invention.

As best seen in FIG. 2, the boom 12 of the telephone headset 10 has a light emitting diode (LED) 30 which is illuminated whenever the base unit 26 is in an "on line" condition. That is, the LED is illuminated whenever the base unit is "off the hook" by being in electronic communication with another telephone set. The LED is preferably positioned adjacent to an end 32 of the boom which is adjacent to the user's mouth. A grill 34 may also be provided adjacent to the end of the boom. The grill admits speech into the boom 12. A microphone can be positioned behind the grill 34. Alternatively, the microphone can also be positioned adjacent to the other end of the boom near the ear piece 16 if the boom is hollow and capable of transmitting sound waves therethrough. The boom 12 is preferably constructed of a suitable material, such as plastic, and may be transparent or translucent, in which case the LED 30 may be positioned at the end of the boom adjacent to the ear piece 16 so that the entire boom is illuminated when the base unit 26 is in the "on-line" condition.

Figure 3:
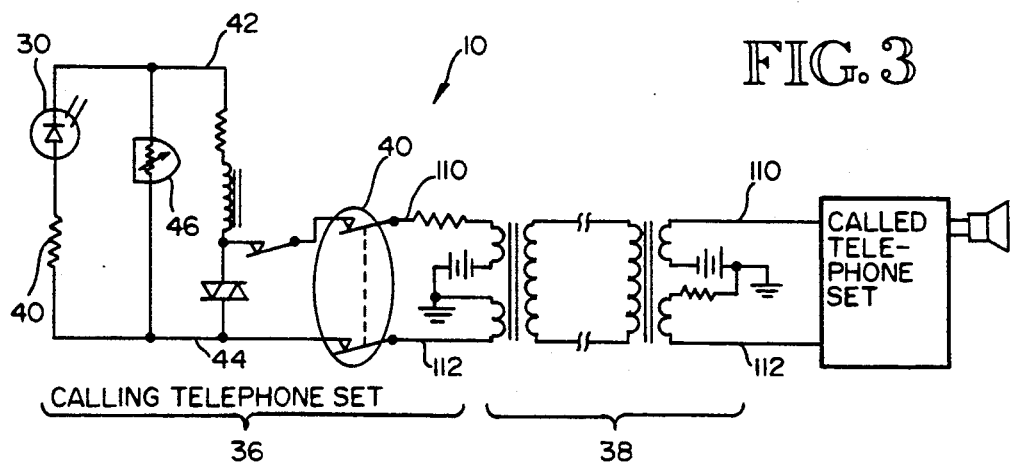
FIG. 3 is an electronic schematic of a portion of a conventional telephone circuit using a first embodiment of the present invention.

FIG. 3 is a schematic illustration of a first embodiment 10 of the invention. Bracketed area 36 is a simplified electronic schematic of the transmitting section of a conventional telephone. Bracketed area 38 is a simplified electronic schematic of the receiving section of a different telephone connected to the transmitting telephone through the telephone company lines. A double pole, single throw switch (commonly referred to as a "hook switch") represented by circled area 40 is the switch which is closed when a conventional handset is lifted from a conventional telephone base unit. The closing of switch 40 causes a maximum short circuit current of approximately 40 mA to be available to flow through transmitting lines 42, 44 for a conventional carbon microphone 46 at a voltage of approximately 3.1 V as measured across the carbon microphone. The microphone acts as a variable resistor to modulate the signal on transmitting lines 42, 44 in accordance with the user's speech. Connected in parallel across the microphone 46 is a series circuit including the LED 30 and a resistor 48. A suitable LED is part number 4300H1LC available from Industrial Devices, Inc., Hackensack, N.J., which will provide sufficient illumination at a relatively low current, such as approximately 2 mA. The resistor 48 has a resistance of approximately 200 to 500 Ohms so that the entire series circuit will draw less than approximately 2 to 5 mA of the available current of 40 mA. Thus, approximately 35 to 38 mA will be available to operate the microphone 46. This diminution in current will not appreciably affect the strength of the single transmitted to the receiving circuit 38 of the telephone through the telephone company's line. A current draw of 10 mA or more will undesirably effect operation of the Telephone.

Figure 4:
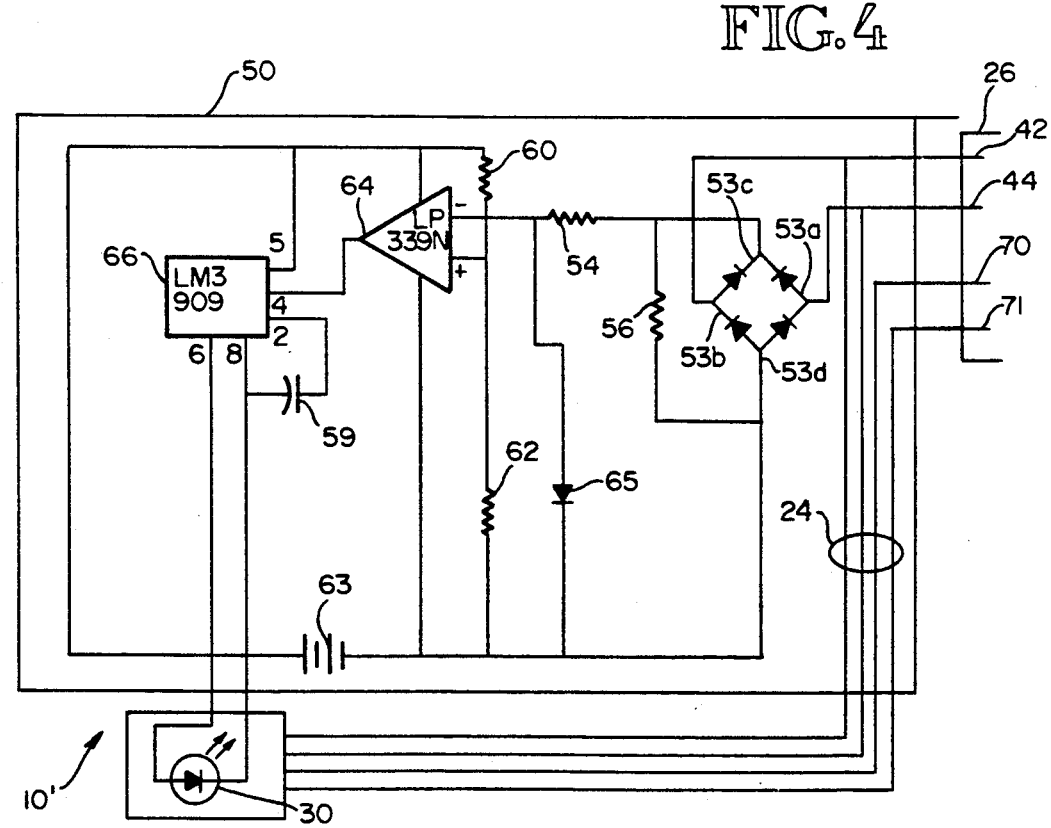
FIG. 4 is an electronic schematic of a second embodiment of the invention for use with an electronic telephone.

FIG. 4 illustrates a second embodiment 10' of the invention which is applicable to modern electronic telephones which do not use the carbon type microphone of the telephone shown in FIG. 3. Instead, telephones of this modern-type use high impedance microphones which draw very little current. The base unit 24 of these telephones may only have a maximum short circuit current across the transmitting lines 42, 44 of approximately 1 mA. However, a characteristic signal is still present across these lines when the phone is an "on-line (i.e., off the hook) condition. Typically, telephones of this type will produce an on-line voltage of between 3 to 5 volts across transmitting lines 42, 44 when the base unit is on-line. When the base unit is off-line, the open circuit voltage across lines 42, 44 is substantially less than 3 to 5 volts, and is typically approximately zero. This second embodiment of the telephone headset 10' is therefore provided with control circuitry indicated by boxed area 50. The control circuitry includes a conventional rectifying circuit 52 comprising four diodes connected in the conventional manner. The input ends 53a, 53b of the rectifying circuit are connected to the transmitting lines 42 and 44. The output ends 53c, 53d of the rectifying circuit are connected through resistors 54 and 56 to the inverting input of a comparator 58. The resistors 54, 56 each have a value of 100 Kohm. The rectifying circuit is used to provide an output voltage of known polarity regardless of the polarity of the characteristic on-line voltage produced by base units from different manufactures. The rectifying circuit 52 can be deleted, and the resistor values adjusted to account for the diode voltage drop if the invention is sold as original equipment with the telephone base unit. A suitable comparator is part number LP339N available from National Semiconductor Corporation, Santa Clara, Calif.

The inverting input of the comparator 58 is connected to the center of a voltage divider between resistors 60 and 62 to provide a reference voltage. Resistor 60 has a value of 1 Mohm, while resistor 62 has a value of approximately 68 Kohm. The voltage divider comprising resistors 60 and 62 is connected in parallel to a three volt voltage source 63 such as can be provided by two AA batteries. Thus, the reference voltage appearing at the non-inverting input of the comparator will be approximately 0.2 V which will be compared to the voltage appearing at the inverting input of the comparator 64. Remembering that the signal appearing at the inverting input of comparator 64 is the output of rectifying circuit 52, it is apparent that the comparator 58 will have a low output at node 64 whenever the absolute value of the voltage appearing between lines 42, 44 is greater than the reference voltage of 0.2 V. Such condition will occur only when the base unit 24 is in the on-line condition. This low output of the comparator 58 is used as a current sink to connect the negative power supply (pin 4) of a conventional "flasher" integrated circuit 66 to the negative end of source 63. A suitable "flasher" circuit is part number LM3909 available from National Semiconductor Corporation, Santa Clara, Calif. A clamping diode 65 is connected between the negative terminal of the voltage source 63, and the non-inverting input of the comparator 58 to prevent any voltage spikes from raising the potential of the non-inverting input above 0.7 V.

The output of the comparator 58 at node 64 is connected to pin 4 of this circuit. Pin 5 is connected to the positive terminal of the power source, pins 2 and 8 are connected together by a 300 micro Farad capacitor 59 to control the flash rate of the LED 30. The LED 30 is connected between pins 6 and 8 of the flasher circuit. The flasher circuit causes the LED 30 to "blink" at approximately 1 Hz and has been found to save substantial power from the battery power voltage source 63. If an external power supply is used instead of battery powered voltage source 63, a conventional operational amplifier configured as a voltage follower may be substituted for the "flasher" circuit 66. The comparator 58 is also powered by the voltage source 63 as shown in the figure. The circuit 50 will thus power the LED 30, whenever the electronic telephone base unit 24 is in the on-line condition. The LED 30 will not flash if the base unit is in an off-line condition. A brighter LED 30, such as an SLH56VR3 manufactured by ROHM Corporation, Irvine, Calif., drawing approximately 20 mA can be substituted for the low current LED used in the first embodiment of FIG. 3. Receiving lines 70, 71 in cable 24 are connected to the headset ear piece (not shown in FIG. 4) in the conventional manner.

Figure 5:
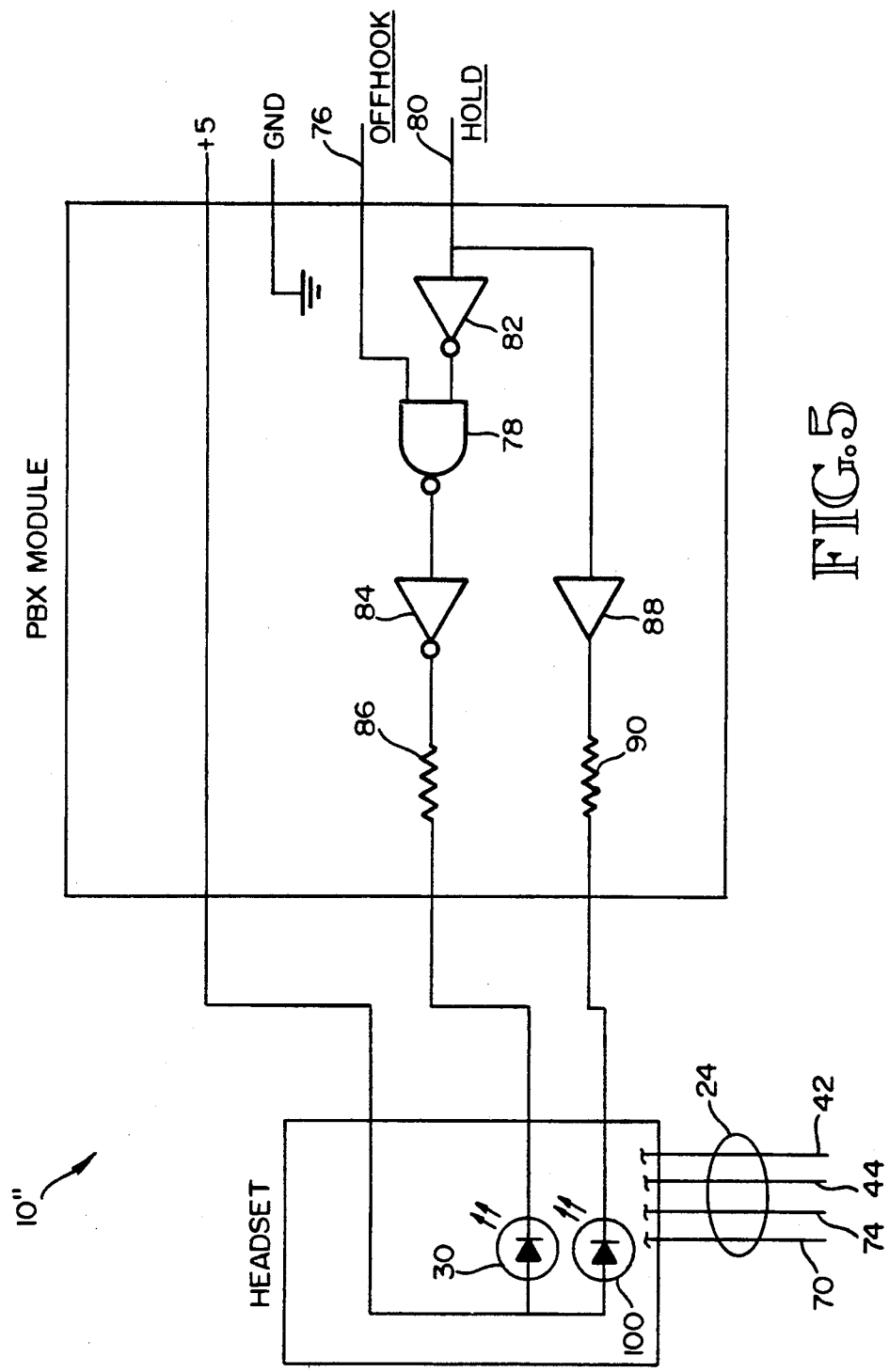
FIG. 5 is an electronic schematic of a third embodiment of the invention for use with a PBX-type telephone system.

FIG. 5 is a third embodiment 10" of the invention which is adapted for use with a PBX-type base unit. Here, line 76 is connected to any node in the base unit (not shown) which generates a logic signal indicating an on-line condition. This signal is fed to one input of a NAND gate 78. Line 80 is connected to any node in the base unit which provides a logic signal indicating that the telephone is on hold. This signal is inverted by an inverter 82 before being fed into the other input of the NAND gate 78. The output of the NAND gate is then connected to a buffer 84 which can comprise another inverter. The combination of NAND gate 78, inverter 84, and inverter 82 provide an output at inverter 84 which is low whenever the base unit is in an on-line condition, and not on hold (assuming the logic signal from the base unit is true-low whenever the base unit is on-line). This output is then passed through resistor 86 having a value of 150 Ohms, which limits the current to a red LED 30 in the headset 10" to indicate that the headset user is on line. The hold signal on line 80 is also fed to a buffer circuit 88 which may comprise two inverters in series. The output of this buffer is fed through another current limiting resistor 90 having the same value as current limiting resistor 86, so as to limit the current through a green LED 100 in the headset. The green LED indicates that the user is on hold and is temporarily free to converse with others. The conventional cable 24, including the transmitting lines 42, 44 and the receiving lines 70, 74 are connected to the microphone and the ear piece, respectively, of the headset in the conventional manner.

Figure 6:
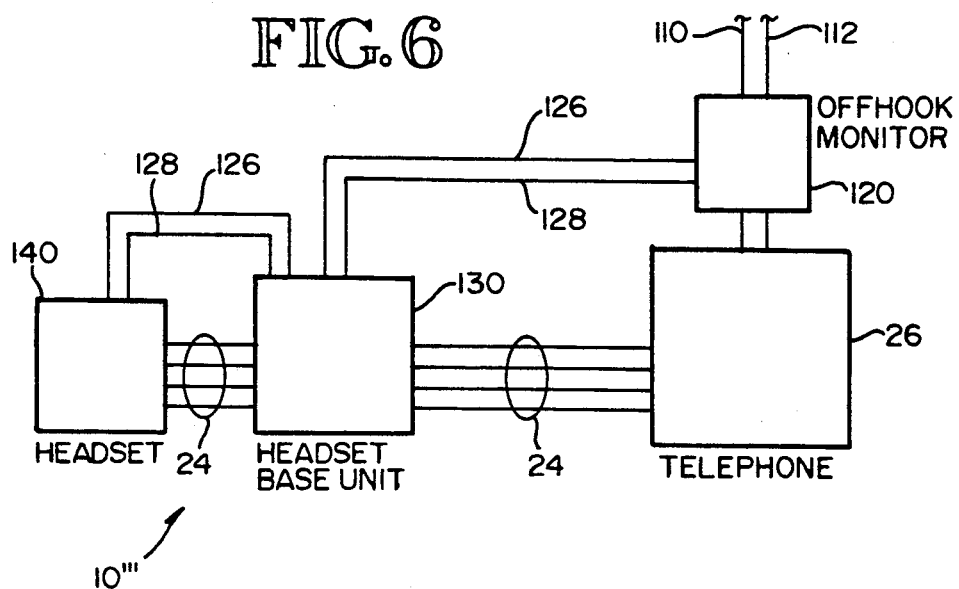
FIG. 6 is a block diagram of a fourth embodiment of the invention which monitors the signals emanating from the telephone company.

FIG. 6 illustrates a fourth embodiment 10''' of the invention which monitors the two lines 110, 112 (see FIG. 3 also) which emanate from the phone company. A voltage of approximately 50 Volts (dc) is apparent between these two lines when the telephone is in the "on hook" condition. When the telephone is in the "off hook" condition the voltage across these two lines drops to less than 25 Volts (approximately 12 Volts dc). This fourth embodiment is therefore provided with a monitoring circuit 120 external to the base unit 26 to detect the "on-line" condition. Two wires 126, 128 also external to the base unit are provided to deliver an LED illuminating signal to a headset control unit 130 and headset 140 having a LED as shown in FIGS. 1 and 2.

Figure 7:
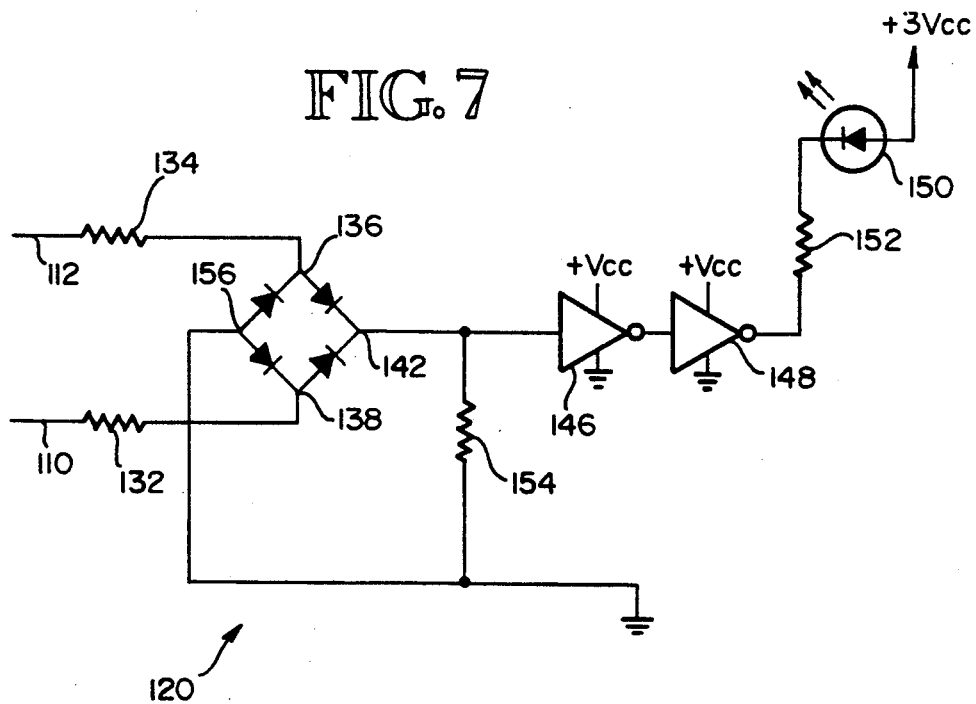
FIG. 7 is a circuit diagram of the fourth embodiment shown in FIG. 6.

A schematic of the monitoring circuit 120 is shown in FIG. 7. The external telephone lines 110, 112 are connected through two 10 Mohm resistors 132, 134 to the inputs 136, 138 of a conventional rectifying circuit 140. One output 142 of the rectifying circuit is connected to inverter 146. This inverter is then connected in series to an inverter 148 which acts as a current sink for the LED 150 which is located on the headset 140 as shown in FIG. 6 and 1. Suitable inverters are model No. 74C04 available from National Semiconductor Corporation, Santa Clara, Calif. A 100 Ohm current limiting resistor 152 is also provided between the LED 152 and inverter 148. A 1.2 MOhm resistor 154 is connected between the one output 142 of the rectifier circuit 140 and the other output 156. Output 156 is also connected to ground. As a result the resistors 134, 154 and 132 form a voltage divider (the voltage drops in the rectifier 140 are inconsequential and the current drawn into the inverter 146 is insignificant). When the voltage across the resistor 154 drops below 1.4 Volts (the threshold voltage of the CMOS inverter 146 when powered by a 3 volt source) the LED 150 is illuminated through inverter 148. This condition occurs whenever the telephone line voltage drops below 25 volts, such as during the "on-line" condition.

Other embodiments and variations of the invention are contemplated. As will be apparent to those of ordinary skill in the art upon reviewing the above disclosure, the specific configurations of the headset and LED maybe altered in accordance with the principles of the invention. For example, the boom 12 can contain a fiber optic cable. The end of which is illuminated by placing the LED at the end of the boom adjacent to the earpiece 16. Furthermore, the invention is adaptable to so called "cordless" headset" units which transmit signals to a telephone base unit by way of radio waves. In this adaptation, the second embodiment 10' of the invention is connected between the headset and the headset transceiver unit which is typically carried at the waist. For the purposes of this specification, the term "base unit" includes such headset transceivers and the like. The invention is therefore not be limited by the above disclosure, but is to be determined in scope by the claims which follow.

I claim:

1. A telephone headset on-line indicator for use with a telephone of the type having a base unit connected to the headset by two transmitting lines and two receiving lines, comprising:
   a boom having a mouthpiece for positioning the mouthpiece adjacent to the mouth of a user, and also having a light emitting device for visually indicating to others that the telephone base unit is in an on-line condition;
   an ear piece connected to the boom for positioning by the boom adjacent to one of the user's ears;
   support means, connected to the ear piece for supporting the boom and ear piece on the user's head; and
   electronic means, electrically associated with the light emitting device for sensing from the two transmitting lines only, when the base unit is in the on-line condition and for illuminating the light emitting device when the on-line condition is sensed.

2. The on-line indicator of claim 1, wherein the light emitting device is positioned near the mouthpiece of the boom.

3. The on-line indicator of claim 1, wherein the boom is manufactured of a substantially translucent material and the light emitting device is positioned to illuminate substantially the entire boom.

4. The on-line indicator of claim 1, wherein the boom has a fiber optical guide for transmitting light from the light emitting device to an end of the boom to be positioned adjacent to the user's mouth.

5. The on-line indicator of claim 1, wherein the telephone is of a conventional type having a current at the two transmitting lines of approximately 40 mA and a voltage of approximately 3.1 V across a microphone in the headset, wherein the light emitting device is a diode, and wherein the electronic means includes a resistor in series with the light emitting diode to form a series circuit electrically connected in parallel with the microphone and across the two transmitting lines, wherein the resistor has a value selected so as to limit the current through the series circuit to a maximum of approximately 10 mA.

6. The on-line indicator of claim 1, wherein the telephone is of a type having a short-circuit current at the two transmitting lines of less than approximately 40 mA, and wherein the electronic means includes a comparator connected to one of the transmitting lines which carriers a characteristic signal when the base unit is in the on-line condition for comparing the characteristic signal to a reference voltage at least equal to an off-line voltage appearing across the two transmitting lines when the base unit is in an off-line condition, means for generating the reference voltage, and driver means connected between the comparator and the light emitting device for driving the light emitting device when the comparator senses the characteristic signal.

7. The on-line indicator of claim 6 wherein the electronic means also includes a rectifier circuit having an input connected between the two transmitting lines for rectifying a characteristic signal which appears on the transmitting leads when the base unit is in the on-line condition to a rectified signal, the rectifier having an output connected to the comparator so that the comparator senses a characteristic signal of known polarity regardless of the polarity of the characteristic signal on the transmitting lines.

8. A telephone headset on-line indicator for use with a PBX telephone of the type having a base unit connected to the headset by electrical lines, comprising:
   a boom having a mouthpiece for positioning the mouthpiece adjacent to the mouth of a user, and also having a first light emitting device for visually indicating to others that the telephone base unit is in an on-line condition;
   an ear piece connected to the boom for positioning the ear piece adjacent to one of the user's ears;
   a support means connected to the ear piece for supporting the boom and ear piece on the user's head; and
   first electronic means, electrically associated with the light emitting device for sensing when the base unit is in the on-line condition and for illuminating the first light emitting device when the on-line condition is sensed.

9. The on-line indicator of claim 8, including a second light emitting device of a different color than the first light emitting device and positioned adjacent to the first light emitting device, the on-line indicator also having second electronic means, electrically associated with the second light emitting device for sensing when the base unit is in a hold condition and for illuminating the second light emitting device when the hold condition is sensed.

10. A method for indicating when a telephone is in an on-line condition, comprising the steps of:
    providing a telephone headset with a light emitting device in the vicinity of a boom of the headset;
    electronically sensing when the telephone is in an on-line condition; and
    illuminating the light emitting device when the on-line condition is sensed.

11. The method of claim 10, wherein the on-line condition is electronically sensed by monitoring a voltage across two transmission lines emanating from a base unit of the telephone to the headset.

12. The method of claim 11 wherein the light emitting device is a light emitting diode.

13. The method of claim 10 wherein the light emitting device is a light emitting diode.

* * * * *